(12) United States Patent
Takaoka et al.

(10) Patent No.: US 11,746,504 B2
(45) Date of Patent: Sep. 5, 2023

(54) CONTROL SYSTEM FOR WORK VEHICLE, METHOD, AND WORK VEHICLE

(71) Applicant: KOMATSU LTD., Tokyo (JP)

(72) Inventors: Yukihisa Takaoka, Tokyo (JP); Kazuki Kure, Tokyo (JP)

(73) Assignee: KOMATSU LTD., Tokyo (JP)

( * ) Notice: Subject to any disclaimer, the term of this patent is extended or adjusted under 35 U.S.C. 154(b) by 638 days.

(21) Appl. No.: 16/636,937

(22) PCT Filed: Feb. 19, 2019

(86) PCT No.: PCT/JP2019/006037
§ 371 (c)(1),
(2) Date: Feb. 6, 2020

(87) PCT Pub. No.: WO2019/187793
PCT Pub. Date: Oct. 3, 2019

(65) Prior Publication Data
US 2020/0370281 A1   Nov. 26, 2020

(30) Foreign Application Priority Data
Mar. 29, 2018  (JP) .................... 2018-065141

(51) Int. Cl.
*E02F 9/26* (2006.01)
*E02F 9/20* (2006.01)

(52) U.S. Cl.
CPC ............ *E02F 9/262* (2013.01); *E02F 9/2041* (2013.01); *E02F 9/2045* (2013.01); *E02F 9/265* (2013.01)

(58) Field of Classification Search
CPC ....... E02F 9/262; E02F 9/2041; E02F 9/2045; E02F 9/265
See application file for complete search history.

(56) References Cited

U.S. PATENT DOCUMENTS

| 5,024,571 A | 6/1991 | Shahar et al. |
| 7,509,198 B2 * | 3/2009 | Shull ................ E02F 3/841 |
| | | 701/50 |

(Continued)

FOREIGN PATENT DOCUMENTS

| JP | 63-60329 A | 3/1988 |
| JP | 2-266070 A | 10/1990 |

(Continued)

OTHER PUBLICATIONS

Examination report No. 1 for the corresponding Australian application No. 2019246096, dated Dec. 9, 2020.

(Continued)

*Primary Examiner* — Imran K Mustafa
(74) *Attorney, Agent, or Firm* — Global IP Counselors, LLP

(57) ABSTRACT

A work vehicle includes a work implement. A control system for the work vehicle includes a controller. The controller acquires an end position and a target distance of work performed by a work vehicle. The controller determines, as a start position, a position that is away from the end position by the target distance. The controller generates a command signal to start work from the start position toward the end position and to operate the work implement according to a target design topography. The controller modifies the target distance based on a result of the work.

8 Claims, 13 Drawing Sheets

(56) References Cited

U.S. PATENT DOCUMENTS

| | | | |
|---|---|---|---|
| 3,639,393 | A1 | 1/2014 | Taylor et al. |
| 2003/0004645 | A1 | 1/2003 | Kochi |
| 2016/0273186 | A1 | 9/2016 | Kami et al. |
| 2017/0009426 | A1* | 1/2017 | Wei ................... E02F 9/2041 |
| 2017/0089033 | A1 | 3/2017 | Matsuyama et al. |
| 2017/0298591 | A1 | 10/2017 | Imaizumi et al. |
| 2019/0218749 | A1* | 7/2019 | Hiromatsu ............ E02F 9/2045 |
| 2020/0217050 | A1* | 7/2020 | Chiba ................... E02F 9/262 |

FOREIGN PATENT DOCUMENTS

| | | |
|---|---|---|
| JP | 2002-352224 A | 12/2002 |
| WO | 2015/181990 A1 | 12/2015 |
| WO | 2016/035898 A1 | 3/2016 |
| WO | 2016/152994 A1 | 9/2016 |
| WO | 2018/025733 A1 | 2/2018 |

OTHER PUBLICATIONS

The International Search Report for the corresponding international application No. PCT/JP2019/006037, dated May 28, 2019.

* cited by examiner

CONTROL SYSTEM FOR WORK VEHICLE, METHOD, AND WORK VEHICLE

CROSS-REFERENCE TO RELATED APPLICATIONS

This application is a U.S. National stage application of International Application No. PCT/JP2019/006037, filed on Feb. 19, 2019. This U.S. National stage application claims priority under 35 U.S.C. § 119(a) to Japanese Patent Application No. 2018-065141, filed in Japan on Mar. 29, 2018, the entire contents of which are hereby incorporated herein by reference.

BACKGROUND

Field of the Invention

The present invention relates to a control system for a work vehicle, a method, and a work vehicle.

Background Information

Conventionally, a system for automatically controlling a work vehicle such as a bulldozer or a grader has been proposed in order to work efficiently. For example, in the system of U.S. Pat. No. 8,639,393, the controller presets a target profile along which a work implement is to operate at a work site from, for example, a topography of the work site. The controller starts digging from a start position on an actual topography of the work site and operates the work implement along the target profile.

SUMMARY

However, due to a factor such as a topography, soil quality, soil hardness, or the like, a work implement may move away from the target profile before reaching an end position to be targeted. In this case, if the work is continued, an uneven topography will be formed and this reduces work efficiency.

Alternatively, due to a factor such as a topography, soil hardness or the like, a large load may apply to a work vehicle, causing a travel device of the work vehicle to slip excessively. In this case, rework may occur and this reduces work efficiency. Alternatively, even when the load applied to the work vehicle is small, unnecessary margin of the vehicle capability is generated and this reduces work efficiency.

An object of the present invention is to solve the above problems.

A control system according to a first aspect is a control system for a work vehicle including a work implement. The control system includes a controller. The controller is programmed to execute the following processing. The controller determines a target design topography indicating a target trajectory of the work implement. At least a portion of the target design topography is positioned below an actual topography. The controller acquires an end position and a target distance of work performed by the work vehicle. The controller determines, as a start position, a position that is away from the end position by the target distance. The controller generates a command signal to start work from the start position toward the end position and to operate the work implement according to the target design topography. The controller modifies the target distance based on a result of the work.

A control system according to a second aspect is a control system for a work vehicle including a work implement. The control system includes a controller. The controller is programmed to execute the following processing. The controller determines a target design topography of which at least a portion is positioned below an actual topography and which indicates a target trajectory of the work implement. The controller acquires an end position and a target soil amount of work performed by the work vehicle. The controller determines, as a start position, a position that is away from the end position by the target soil amount. The controller generates a command signal to start work from the start position toward the end position and to operate the work implement according to the target design topography. The controller modifies the target soil amount based on a result of the work.

A control system according to a third aspect is a control system for a work vehicle including a travel device and a work implement. The control system includes a controller. The controller is programmed to execute the following processing. The controller determines a target design topography indicating a target trajectory of the work implement. At least a portion of the target design topography is positioned below an actual topography. The controller acquires an end position and a target distance of work performed by the work vehicle. The controller determines, as a start position, a position that is away from the end position by the target distance. The controller generates a command signal to start work from the start position toward the end position and to operate the work implement according to the target design topography. The controller acquires a load parameter indicating a magnitude of the load on the travel device. The controller modifies the target distance according to the load parameter.

According to the first aspect of the present invention, the target distance is modified based on a result of the work. Accordingly, the start position of the work is modified and this enables to prevent the work implement from moving away from the target design topography before the work implement reaches the end position. Alternatively, generation of unnecessary margin of the vehicle capability can be prevented. As a result, a reduction in work efficiency can be prevented.

According to the second aspect of the present invention, the target soil amount is modified based on a result of work. Accordingly, the start position of the work is modified and this enables to prevent the work implement from moving away from the target design topography before the work implement reaches the end position. Alternatively, generation of unnecessary margin of the vehicle capability can be prevented. As a result, a reduction in work efficiency can be prevented.

According to the third aspect of the present invention, the target distance is modified according to the load parameter. Accordingly, the start position of the work is modified and this enables to prevent a load on the travel device from becoming excessively large. Alternatively, a load on the work vehicle can be prevented from becoming excessively small and generation of unnecessary margin of the vehicle capability can be prevented. As a result, a reduction in work efficiency can be prevented.

DETAILED DESCRIPTION OF EMBODIMENT(S)

Figure 1:
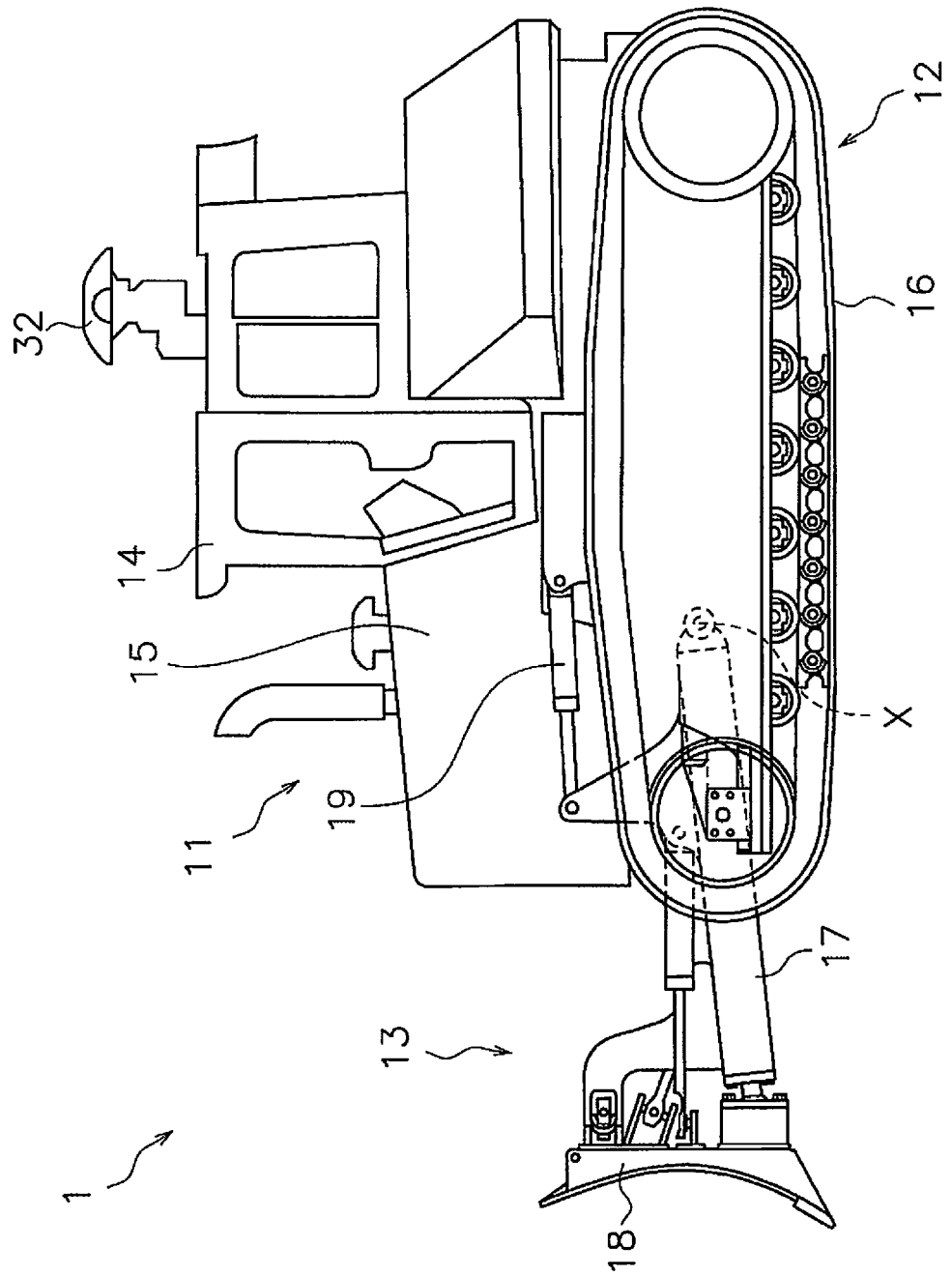
FIG. 1 is a side view of a work vehicle according to an embodiment.

A work vehicle according to an embodiment will now be described with reference to the drawings. FIG. 1 is a side view of a work vehicle 1 according to an embodiment. The work vehicle 1 according to the present embodiment is a bulldozer. The work vehicle 1 includes a vehicle body 11, a travel device 12, and a work implement 13.

The vehicle body 11 includes an operating cabin 14 and an engine compartment 15. An operator's seat that is not illustrated is disposed in the operating cabin 14. The engine compartment 15 is disposed in front of the operating cabin 14. The travel device 12 is attached to a bottom portion of the vehicle body 11. The travel device 12 includes a pair of right and left crawler belts 16. Only the left crawler belt 16 is illustrated in FIG. 1. The work vehicle 1 travels due to the rotation of the crawler belts 16.

The work implement 13 is attached to the vehicle body 11. The work implement 13 includes a lift frame 17, a blade 18, and a lift cylinder 19.

The lift frame 17 is attached to the vehicle body 11 so as to be movable up and down around an axis X extending in the vehicle width direction. The lift frame 17 supports the blade 18. The blade 18 is disposed in front of the vehicle body 11. The blade 18 moves up and down as the lift frame 17 moves up and down. The lift frame 17 may be attached to the travel device 12.

The lift cylinder 19 is coupled to the vehicle body 11 and the lift frame 17. Due to the extension and contraction of the lift cylinder 19, the lift frame 17 rotates up and down around the axis X.

Figure 2:
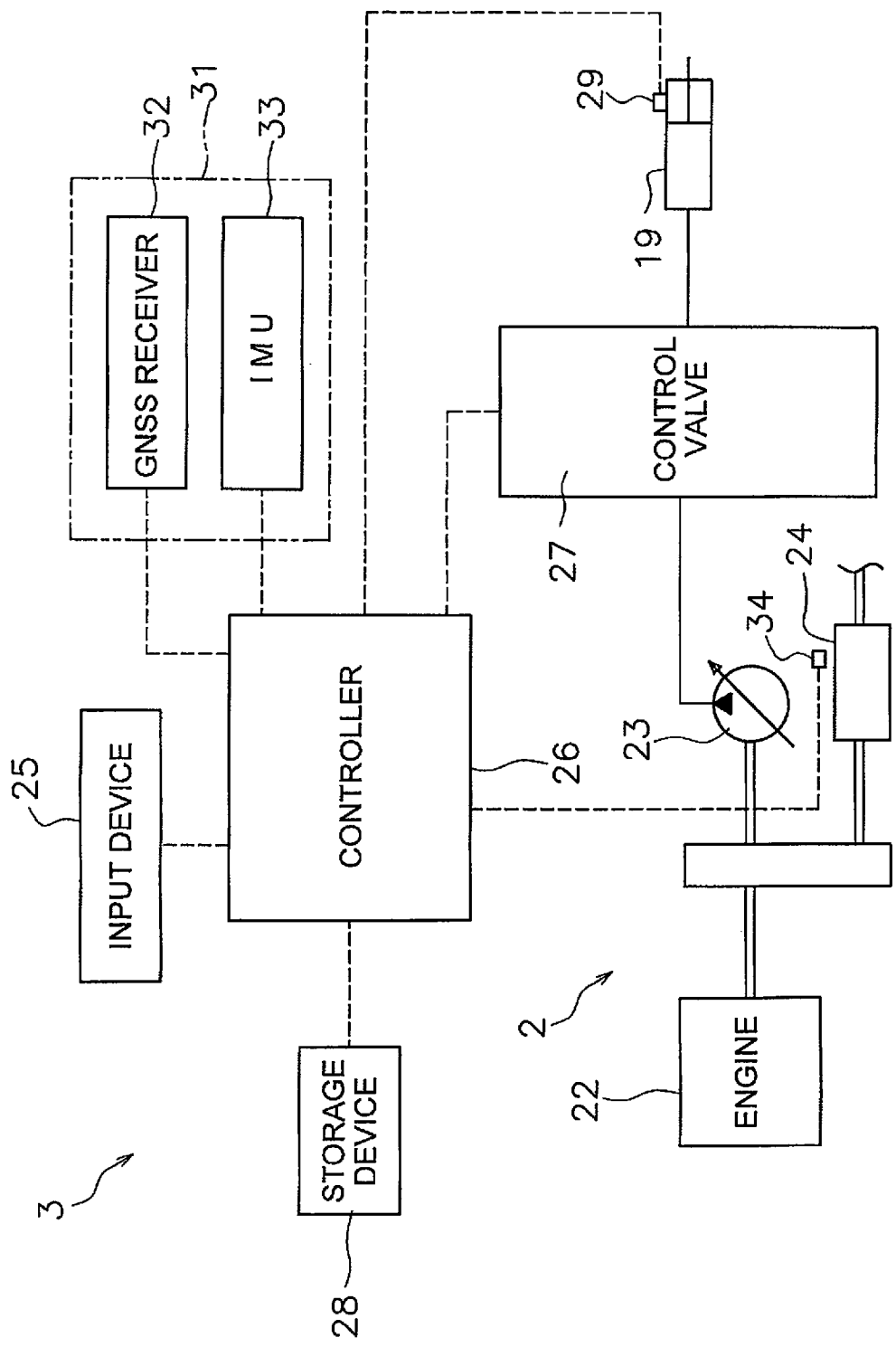
FIG. 2 is a block diagram of a drive system and a control system of a work vehicle.

FIG. 2 is a block diagram of a configuration of a drive system 2 and a control system 3 of the work vehicle 1. As illustrated in FIG. 2, the drive system 2 includes an engine 22, a hydraulic pump 23, and a power transmission device 24.

The hydraulic pump 23 is driven by the engine 22 to discharge hydraulic fluid. The hydraulic fluid discharged from the hydraulic pump 23 is supplied to the lift cylinder 19. Although only one hydraulic pump 23 is illustrated in FIG. 2, a plurality of hydraulic pumps may be provided.

The power transmission device 24 transmits driving force of the engine 22 to the travel device 12. The power transmission device 24 may be a hydro static transmission (HST), for example. Alternatively, the power transmission device 24 may be, for example, a torque converter or a transmission having a plurality of transmission gears.

The control system 3 includes an input device 25, a controller 26, a storage device 28, and a control valve 27. The input device 25 is disposed in the operating cabin 14. The input device 25 is a device for setting automatic control of the work vehicle 1 described later. The input device 25 receives an operation by an operator and outputs an operation signal corresponding to the operation. The operation signal of the input device 25 is output to the controller 26.

The input device 25 includes, for example, a touch screen type display. The input device 25 is not limited to a touch screen type and may include hardware keys. The input device 25 may be disposed at a location (for example, a control center) that is away from the work vehicle 1. The operator may operate the work vehicle 1 from the input device 25 in the control center via wireless communication.

The controller 26 is programmed to control the work vehicle 1 based on acquired data. The controller 26 includes, for example, a processor such as a CPU. The controller 26 acquires an operation signal from the input device 25. The controller 26 is not limited to one unit and may be divided into a plurality of controllers. The controller 26 causes the work vehicle 1 to travel by controlling the travel device 12 or the power transmission device 24. The controller 26 moves the blade 18 up and down by controlling the control valve 27.

The control valve 27 is a proportional control valve and is controlled by a command signal from the controller 26. The control valve 27 is disposed between a hydraulic actuator such as the lift cylinder 19 and the hydraulic pump 23. The control valve 27 controls the flow rate of the hydraulic fluid supplied from the hydraulic pump 23 to the lift cylinder 19. The controller 26 generates a command signal to the control valve 27 so that the blade 18 operates. Accordingly, the lift cylinder 19 is controlled. The control valve 27 may be a pressure proportional control valve. Alternatively, the control valve 27 may be an electromagnetic proportional control valve.

Figure 3:
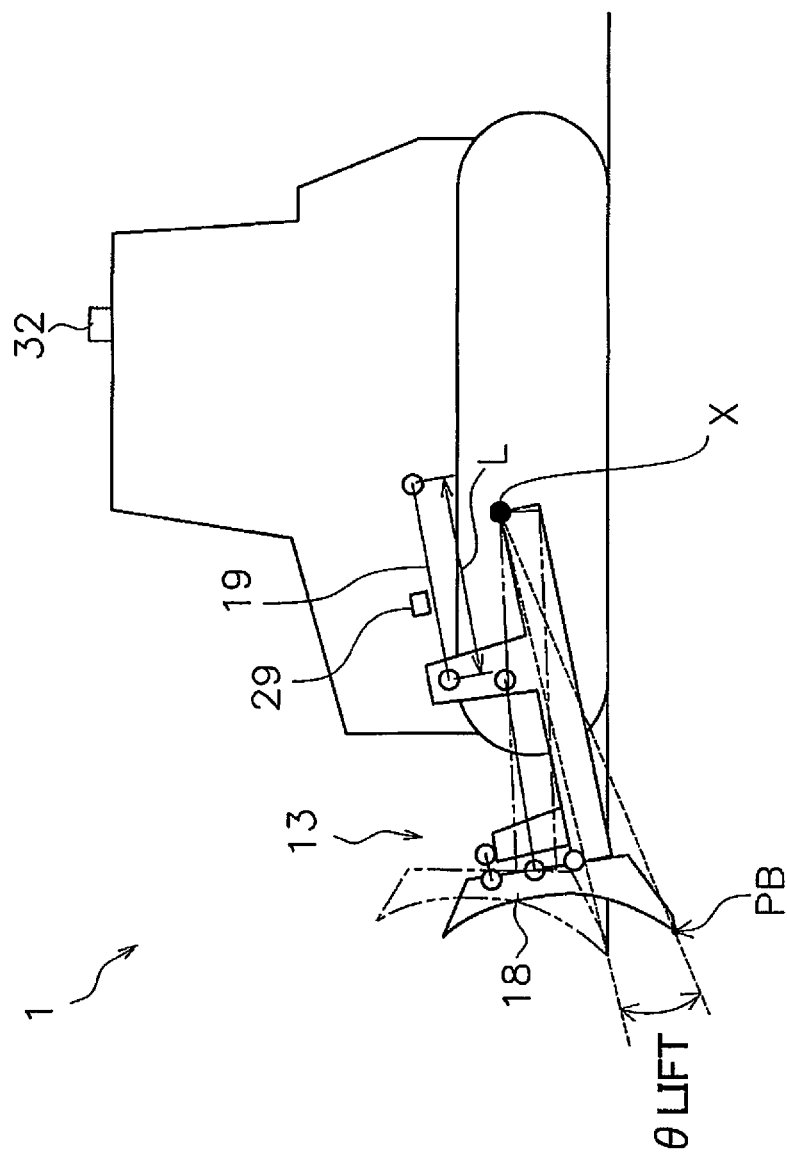
FIG. 3 is a schematic view of a configuration of a work vehicle.

The control system 3 includes a work implement sensor 29. The work implement sensor 29 senses a position of the work implement 13 and outputs a work implement position signal indicating the position of the work implement 13. The work implement sensor 29 may be a displacement sensor that senses the displacement of the work implement 13. Specifically, the work implement sensor 29 senses the stroke length of the lift cylinder 19 (hereinafter referred to as "lift cylinder length L"). As illustrated in FIG. 3, the controller 26 calculates a lift angle °lift of the blade 18 based on the lift cylinder length L. The work implement sensor 29 may be a rotation sensor that directly senses a rotation angle of the work implement 13.

The control system 3 includes an output sensor 34 that measures an output of the power transmission device 24. When the power transmission device 24 is an HST including a hydraulic motor, the output sensor 34 may be a pressure sensor that senses driving hydraulic pressure of the hydraulic motor. The output sensor 34 may be a rotation sensor that senses an output rotation speed of the hydraulic motor. The output sensor 34 may be a rotation sensor that senses an output rotation speed of the power transmission device 24. A sensing signal indicating a sensed value of the output sensor 34 is output to the controller 26.

FIG. 3 is a schematic view of a configuration of the work vehicle 1. In FIG. 3, a reference position of the work implement 13 is indicated by a chain double-dashed line. The reference position of the work implement 13 is a position of the blade 18 in a state where the tip of the blade 18 is in contact with the ground surface on a horizontal ground surface. The lift angle θlift is an angle from the reference position of the work implement 13.

As illustrated in FIG. 2, the control system 3 includes a position sensor 31. The position sensor 31 measures a position of the work vehicle 1. The position sensor 31 includes a global navigation satellite system (GNSS) receiver 32 and an IMU 33. The GNSS receiver 32 is, for example, a receiver for global positioning system (GPS). For example, an antenna of the GNSS receiver 32 is disposed on the operating cabin 14. The GNSS receiver 32 receives a positioning signal from a satellite and calculates the position of the antenna based on the positioning signal to generate vehicle body position data. The controller 26 acquires the vehicle body position data from the GNSS receiver 32. The controller 26 acquires the traveling direction and vehicle speed of the work vehicle 1 from the vehicle body position data.

The vehicle body position data may not be data of the antenna position. The vehicle body position data may be data indicating the position of any location whose relationship with the antenna position is fixed in the work vehicle 1 or at the surroundings of the work vehicle 1.

The IMU 33 is an inertial measurement unit. The IMU 33 acquires vehicle body inclination angle data. The vehicle body inclination angle data includes an angle (pitch angle) with respect to the horizontal in the vehicle longitudinal direction and an angle (roll angle) with respect to the horizontal in the vehicle lateral direction. The controller 26 acquires the vehicle body inclination angle data from the IMU 33.

The controller 26 calculates a blade tip position PB from the lift cylinder length L, the vehicle body position data, and the vehicle body inclination angle data. As illustrated in FIG. 3, the controller 26 calculates global coordinates of the GNSS receiver 32 based on the vehicle body position data. The controller 26 calculates the lift angle θlift based on the lift cylinder length L. The controller 26 calculates local coordinates of the blade tip position PB with respect to the GNSS receiver 32 based on the lift angle θlift and vehicle body dimension data. The vehicle body dimension data is stored in the storage device 28 and indicates the position of the work implement 13 with respect to the GNSS receiver 32. The controller 26 calculates the global coordinates of the blade tip position PB based on the global coordinates of the GNSS receiver 32, the local coordinate of the blade tip position PB, and the vehicle body inclination angle data. The controller 26 acquires the global coordinates of the blade tip position PB as blade tip position data.

The storage device 28 includes, for example, a memory and an auxiliary storage device. The storage device 28 may be a RAM, a ROM or the like. The storage device 28 may be a semiconductor memory, a hard disk or the like. The storage device 28 is an example of a non-transitory computer-readable recording medium. The storage device 28 stores computer commands that are executable by the processor and for controlling the work vehicle 1.

The storage device 28 stores design topography data and work site topography data. The design topography data indicates a final design topography. The final design topography is a final target shape of a surface of the work site. The design topography data is, for example, a construction drawing in a three-dimensional data format. The work site topography data indicates a wide topography of the work site. The work site topography data is, for example, an actual topography survey map of a three-dimensional data format. The work site topography data can be acquired by aerial laser survey, for example.

The controller 26 acquires actual topography data. The actual topography data indicates an actual topography of the work site. The actual topography of the work site is a topography of a region along the traveling direction of the work vehicle 1. The actual topography data is acquired by calculation in the controller 26 from the work site topography data and the position and traveling direction of the work vehicle 1 acquired from the aforementioned position sensor 31. The actual topography data may be acquired from distance measurement of the actual topography by, for example, a laser imaging detection and ranging (LIDAR) mounted on the vehicle.

The controller 26 automatically controls the work implement 13 based on the actual topography data, the design topography data, and the blade tip position data. The automatic control of the work implement 13 may be semi-automatic control performed in combination with manual operation by the operator. Alternatively, the automatic control of the work implement 13 may be fully automatic control performed without manual operation by an operator. The traveling of the work vehicle 1 may be automatically controlled by the controller 26. For example, the traveling control of the work vehicle 1 may be fully automatic control performed without manual operation by an operator. Alternatively, the traveling control may be semi-automatic control performed in combination with manual operation by the operator. Alternatively, the traveling of the work vehicle 1 may be performed with manual operation by the operator.

Figure 4:
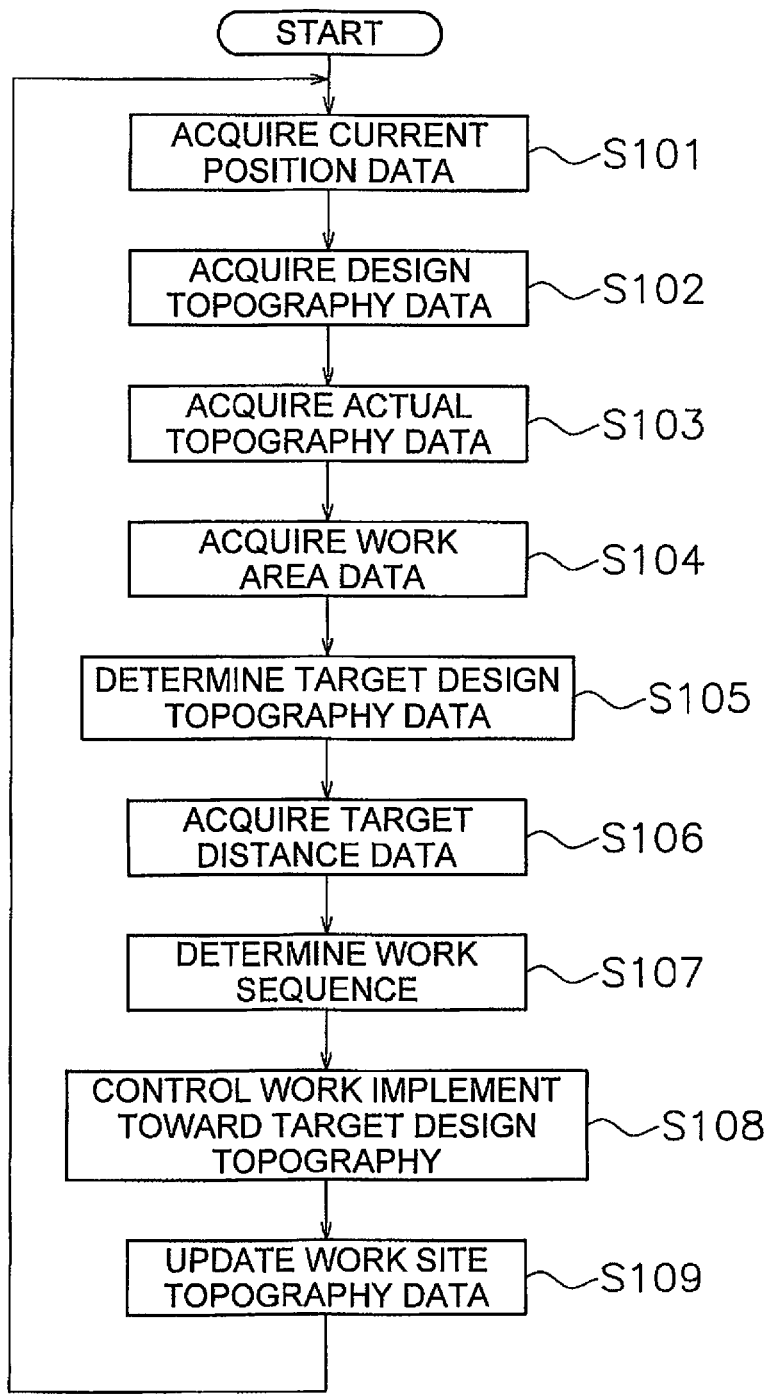
FIG. 4 is a flowchart illustrating processing of automatic control of a work vehicle.

The automatic control of the work vehicle 1 in digging executed by the controller 26 will be described below. In the following description, for example, the work vehicle 1 travels back and forth on each slot in slot dosing to dig each slot. FIG. 4 is a flowchart illustrating processing of automatic control.

As illustrated in FIG. 4, in step S101, the controller 26 acquires current position data. At this time, the controller 26 acquires the current blade tip position PB of the blade 18 as described above.

Figure 5:
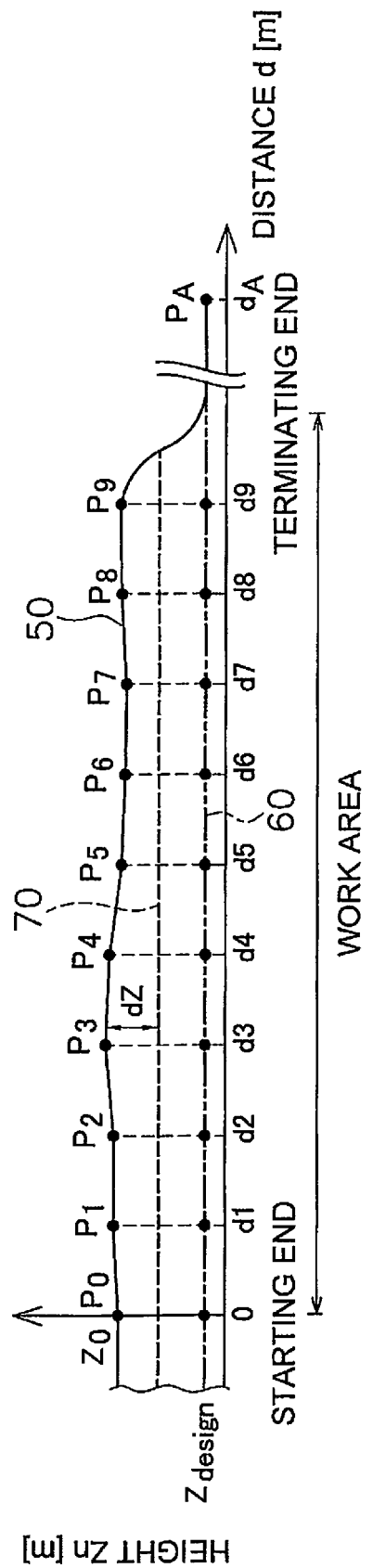
FIG. 5 is a diagram illustrating an example of a final design topography, an actual topography, and a target design topography.

In step S102, the controller 26 acquires design topography data. As illustrated in FIG. 5, the design topography data includes a height Zdesign of a final design topography 60 at a plurality of reference points Pn (n=0, 1, 2, 3, ..., A) in the traveling direction of the work vehicle 1. The plurality of reference points Pn indicate a plurality of points at a predetermined interval along the traveling direction of the work vehicle 1. The plurality of reference points Pn are on a travel path of the blade 18. In FIG. 5, the final design topography 60 has a flat shape parallel to the horizontal direction, but may have a different shape.

In step S103, the controller 26 acquires actual topography data. The controller 26 acquires the actual topography data by calculation from the work site topography data acquired from the storage device 28, and the position data and traveling direction data of the vehicle body acquired from the position sensor 31.

The actual topography data is information indicating a topography positioned in the traveling direction of the work vehicle 1. FIG. 5 illustrates a cross section of an actual topography 50. In FIG. 5, the vertical axis indicates the height of the topography, and the horizontal axis indicates the distance from the current position in the traveling direction of the work vehicle 1.

Specifically, the actual topography data includes the height $Zn$ of the actual topography 50 at the plurality of reference points Pn from the current position to a predetermined topography recognition distance dA in the traveling direction of the work vehicle 1. In the present embodiment, the current position is a position determined based on the current blade tip position PB of the work vehicle 1. The current position may be determined based on a current position of another portion of the work vehicle 1. The plurality of reference points are arranged at a predetermined interval, for example, every one meter.

In step S104, the controller 26 acquires work area data. The work area data indicates a work area set by the input device 25. As illustrated in FIG. 5, the work area includes a starting end and a terminating end. The work area data includes coordinates of the starting end and coordinates of the terminating end. Alternatively, the work area data includes the coordinates of the starting end and the length of the work area, and the coordinates of the terminating end may be calculated from the coordinates of the starting end and the length of the work area. Alternatively, the work area data includes the coordinates of the terminating end and the length of the work area, and the coordinates of the starting end may be calculated from the coordinates of the terminating end and the length of the work area.

The controller 26 acquires the work area data based on an operation signal from the input device 25. The controller 26 may acquire the work area data by another method. For example, the controller 26 may acquire the work area data from an external computer that performs construction management of the work site.

In step S105, the controller 26 determines target design topography data. The target design topography data indicates a target design topography 70 illustrated by a dashed line in FIG. 5. The target design topography 70 indicates a desired trajectory of the tip of the blade 18 in work, that is, a target trajectory. The target design topography 70 is a target profile of the topography to be worked and indicates a desired shape as a result of digging work.

As illustrated in FIG. 5, the controller 26 determines the target design topography 70 of which at least a portion is positioned below the actual topography 50. For example, the controller 26 determines the target design topography 70 that extends in the horizontal direction. The controller 26 generates the target design topography 70 that is displaced downward from the actual topography 50 by a predetermined distance dZ. The predetermined distance dZ may be set based on an operation signal from the input device 25. The predetermined distance dZ may be acquired from an external computer that performs construction management of the work site. The predetermined distance dZ may be a fixed value.

The controller 26 determines the target design topography 70 so that the target design topography 70 does not go below the final design topography 60. Therefore, the controller 26 determines the target design topography 70 positioned at or above the final design topography 60 and below the actual topography 50 during digging work.

Figure 6:
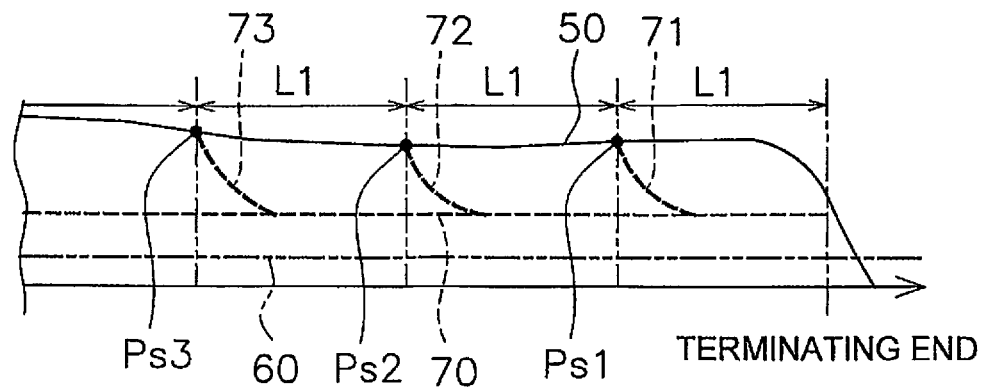
FIG. 6 is a diagram illustrating an example of a start position of work on a target design topography.

In step S106, the controller 26 acquires target distance data. As illustrated in FIG. 6, the controller 26 performs digging according to the target design topography 70 for each of a plurality of cuts 71 to 73 aligned in the traveling direction of the work vehicle 1. In FIG. 6, only a portion of the plurality of cuts in the work area is illustrated. The target distance data indicates a target distance L1 between a start position and an end position of digging of each of the cuts 71 to 73.

The target distance L1 may be a preset constant value. The target distance L1 may be set by the operator using the input device 25. The target distance L1 may be determined by the controller 26 based on a predetermined parameter. The predetermined parameter may be a target soil amount. The target soil amount may be determined from machine capability of the work vehicle 1 such as the capacity of the blade 18.

In step S107, the controller 26 determines a work sequence. The controller 26 determines the start position of work on each of the cuts 71 to 73 in the work area and the work sequence. The controller 26 acquires an end position of work performed by the work implement 13 and determines a position that is away from the end position by the target distance L1 as a start position. The controller 26 acquires a next end position and determines a position that is away from the next end position by a modified target distance L1 as a next start position.

Specifically, the controller 26 determines a position of the terminating end of the work area as a first end position. The controller 26 determines, as a first start position Ps1, a position that is away from the first end position toward the starting end by the target distance L1. The controller 26 determines the first start position Ps1 as a second end position and determines, as a second start position Ps2, a position that is away from the second end position toward the starting end by the target distance L1. The controller 26 determines the second start position Ps2 as a third end position and determines, as a third start position Ps3, a position that is away from the third end position toward the starting end by the target distance L1. Similarly, for other cuts, the controller 26 determines a plurality of starting positions in the work area and determines the work sequence so as to perform digging in order from the start position closer to the terminating end.

In step S108, the controller 26 controls the blade 18 toward the target design topography 70. The controller 26 generates a command signal to the work implement 13 so that work by the work implement starts from the start position determined in step S107 toward the end position and the blade tip position of the blade 18 moves according to the target design topography 70 generated in step S105. The generated command signal is input to the control valve 27. As a result, the blade tip position PB of the blade 18 moves from the start position toward the target design topography 70. The work includes starting digging a surface soil with the blade 18 from the start position and taking the blade 18 out of the surface soil at the end position.

When the digging of one cut 71 started from the first start position Ps1 is completed, the controller 26 moves the work vehicle 1 to the second start position Ps2 to dig a next cut 72. When the digging of the cut 72 is completed, the controller 26 moves the work vehicle 1 to the third start position Ps3 to dig a next cut 73. By repeating the work, the digging of one target design topography 70 is completed in the work area.

When the digging of one target design topography 70 is completed in the work area, the controller 26 determines the start position of work for each of the cuts and the work sequence on the next target design topography 70 positioned further below and starts digging of each of the cuts. By repeating such processing, digging is performed so that the actual topography 50 approaches the final design topography 60.

In step S109, the controller 26 updates the work site topography data. The controller 26 updates the work site topography data based on position data indicating the latest trajectory of the blade tip position PB. The work site topography data may be updated as needed. Alternatively, the controller 26 may calculate a position of the bottom surface of the crawler belts 16 from the vehicle body position data and the vehicle body dimension data and update the work site topography data according to the position data indicating the trajectory of the bottom surface of the crawler belts 16. In this case, the update of the work site topography data can be performed instantly.

Alternatively, the work site topography data may be generated from survey data measured by a survey device outside of the work vehicle 1. Aerial laser survey may be used as an external survey device, for example. Alternatively, the actual topography 50 may be imaged by a camera, and the work site topography data may be generated from the image data captured by the camera. For example, aerial photographic survey using an unmanned aerial vehicle (UAV) may be used. In the case of using the external survey device or the camera, the work site topography data may be updated at a predetermined interval, or as needed.

Figure 7:
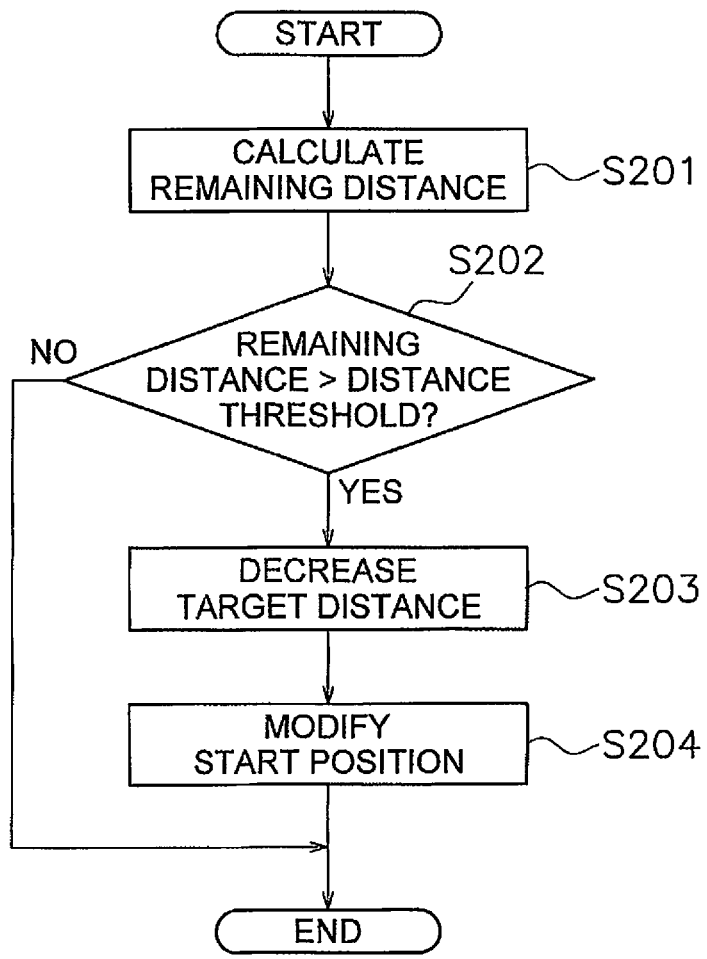
FIG. 7 is a flowchart illustrating a method for modifying a start position according to a first embodiment.

Next, processing of modifying the start position executed by the controller 26 will be described. FIG. 7 is a flowchart illustrating processing of modifying the start position according to the first embodiment. During the digging of each cut, a load may apply to the work implement 13 before the tip of the blade 18 reaches the end position due to a factor such as a topography or soil hardness, and the work implement 13 may move away from the target design topography 70 by load control that raises the work implement 13 in order to release the load. It is an example of a result of the work that the load control is executed in order to release the load during the digging work. The controller 26 can determine whether the work implement 13 moves away from the target design topography 70 based on whether the load control has been executed. In this case, the controller 26 executes processing as illustrated in FIG. 7.

Figure 8:
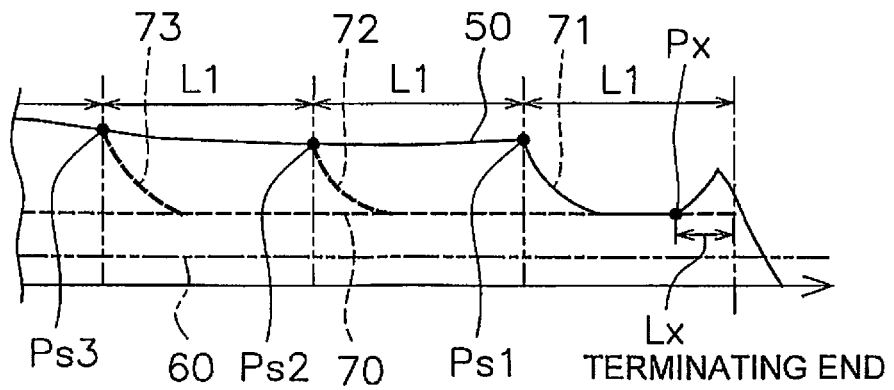
FIG. 8 is a diagram illustrating a method for modifying a start position.

As illustrated in FIG. 7, in step S201, the controller 26 calculates a remaining distance Lx in which a remaining soil is present. As illustrated in FIG. 8, the remaining distance Lx is a distance from a point Px at which the tip of the blade 18 moves away from the target design topography 70 to the end position.

The presence of the remaining soil may be sensed by a sensing means such as a laser or a stereo camera, or may be sensed by comparing the actual topography 50 stored in the controller 26 with a result of the trajectory which the work implement 13 has moved. The presence of the remaining soil may be sensed based on a result of the traveling trajectory of the crawler belts 16. A result as to whether the remaining soil is present is an example of a result of work. The controller 26 can determine whether the work implement moves away from the target design topography based on the determination result of the presence of the remaining soil.

In step S202, the controller 26 determines whether the remaining distance Lx is greater than a predetermined distance threshold. The distance threshold may be a fixed value preset in consideration of work efficiency. The distance threshold may be set by the operator using the input device 25. When the remaining distance Lx is greater than the distance threshold, the process proceeds to step S203.

Figure 9:
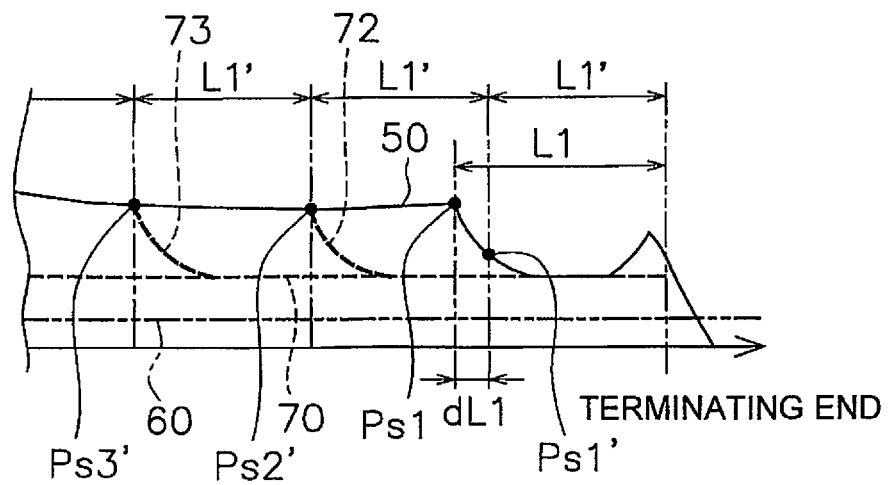
FIG. 9 is a diagram illustrating a method for modifying a start position.

In step S203, the controller 26 modifies a target distance L1 so as to decrease the target distance L1. As illustrated in FIG. 9, the controller 26 modifies the target distance from L1 to L1'. A decrease dL1 of the target distance decreased from L1 to L1' may be a constant value. Alternatively, the decrease dL1 of the target distance may be determined by the controller 26 according to the length of the remaining distance Lx. That is, the controller 26 may decrease the target distance L1 as the remaining distance Lx increases.

In step S204, the controller 26 modifies the start position. As illustrated in FIG. 9, the controller 26 determines, as a modified first start position Ps1', a position that is away from the terminating end toward the starting end by a modified target distance L1'. The controller 26 determines, as the modified first start position Ps1', a position that is closer to the terminating end than the initial first start position Ps1 is.

The controller 26 determines the modified first start position Ps1' as a second end position. The controller determines, as a modified second start position Ps2', a position that is away from the second end position toward the starting end by the modified target distance L1'. The controller 26 determines the modified second start position Ps2' as a third end position and determines, as a modified third start position Ps3', a position that is away from the third end position toward the starting end by the modified target distance L1'. Hereinafter, the controller 26 similarly modifies a plurality of start positions in the work area.

Then, the controller 26 generates a command signal to the work implement 13 so that work by the work implement starts from the modified start position toward the end position and the blade tip position of the blade 18 moves according to the target design topography 70 as in step S108 described above.

When the remaining distance Lx is equal to or less than the predetermined distance threshold in step S202, the modification of the start position in step S203 is not performed. In this case, the controller 26 digs each cut according to the work sequence initially determined.

The above example describes the case where the tip of the blade 18 moves away from the target design topography 70 during the digging of a first cut 71 closest to the terminating end. The controller 26 may execute the same processing as the above when the tip of the blade 18 moves away the target design topography 70 during the digging of another cut (for example, a second cut 72 or a third cut 73).

In the first embodiment described above, in the case where the work implement 13 moves away from the target design topography 70 before reaching the end position, the target distance L1 is modified to decrease the target distance L1 when the remaining distance Lx is greater than the distance threshold. Accordingly, the start position of work is modified and this enables to prevent the work implement 13 from moving away from the target design topography 70 before the work implement 13 reaches the end position. As a result, a reduction in work efficiency can be prevented.

Figure 10:
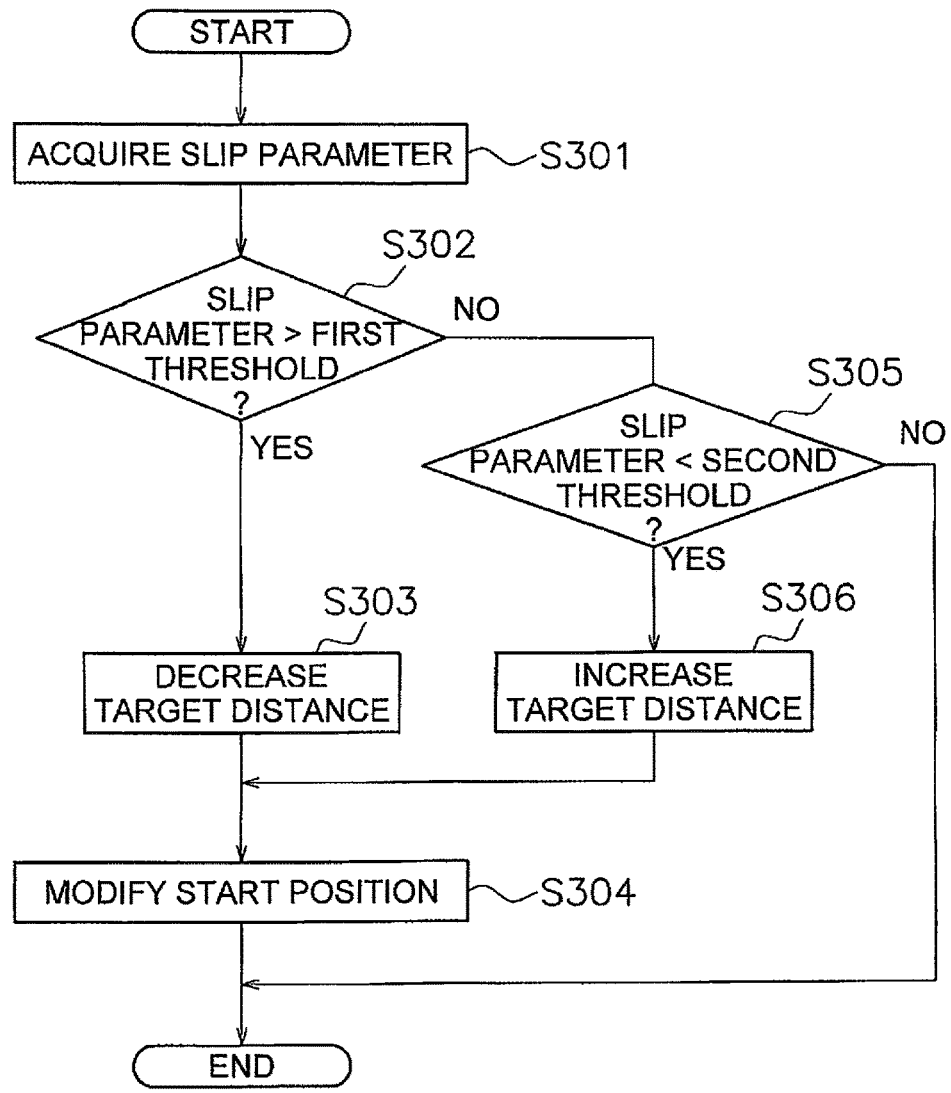
FIG. 10 is a flowchart illustrating processing of a method for modifying a start position according to a second embodiment.

Next, a method for modifying the start position according to a second embodiment will be described. FIG. 10 is a flowchart illustrating processing in order to modify the start position according to the second embodiment. As illustrated in FIG. 10, in step S301, the controller 26 acquires a slip parameter. The slip parameter indicates a degree of slip of the crawler belts 16 of the travel device 12. As the degree of slip increases, the slip parameter increases. For example, the controller 26 calculates a slip parameter Rs (%) from the following formula (1).

$$Rs = (1 - Va/Vt) \times 100 \quad (1)$$

Va is an actual vehicle speed of the work vehicle 1. For example, the controller 26 calculates the actual vehicle speed Va from the position data of the work vehicle 1 acquired from the position sensor 31. Vt is a theoretical vehicle speed of the work vehicle 1. The theoretical vehicle speed Vt is an estimated value of the vehicle speed of the work vehicle 1 in a state where no slip occurs. For example, the controller 26 calculates the theoretical vehicle speed Vt from a sensed value from the output sensor 34.

The method for acquiring the slip parameter is not limited to the above method, and may be changed. The slip parameter is not limited to the above (1) as long as the slip parameter changes according to the degree of slip.

In step S302, the controller 26 determines whether the slip parameter is greater than a predetermined first threshold. The first threshold may be a constant value preset in consideration of work efficiency. The first threshold may be set by the operator using the input device 25. When the slip parameter is greater than the first threshold, the process proceeds to step S303.

Figure 11:
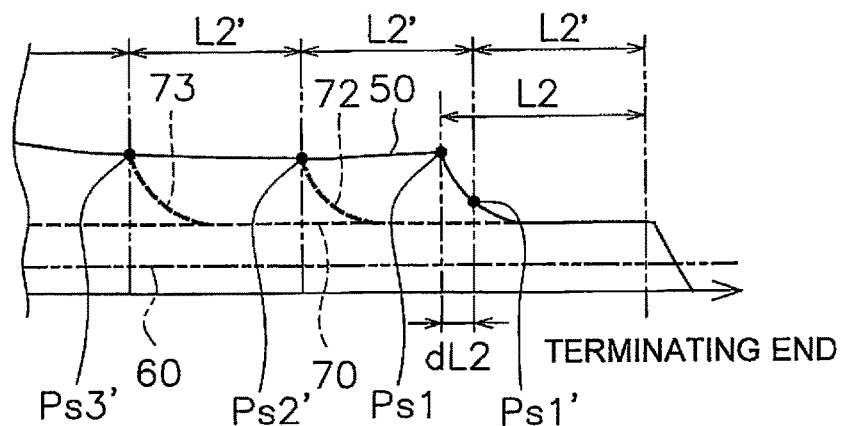
FIG. 11 is a diagram illustrating a method for modifying a start position.

In step S303, the controller 26 modifies a target distance L2 so as to decrease the target distance L2. As illustrated in FIG. 11, the controller 26 modifies the target distance L2 from an initial value L2 to L2'. A decrease dL2 of the target distance decreased from L2 to L2' may be a constant value. Alternatively, the decrease dL2 of the target distance L1 may be determined by the controller 26 according to the slip parameter. That is, the controller 26 may decrease the target distance L2 as the slip parameter increases.

In step S304, the controller 26 modifies the start position. As illustrated in FIG. 11, the controller 26 determines, as the modified first start position Ps1', a position that is away from the terminating end toward the starting end by the modified target distance L2'. The controller 26 determines, as the modified first start position Ps', a position that is closer to the terminating end than the initial first start position Ps1 is. The modification of another start position and the control of the work implement 13 based on the modified start position are the same as the aforementioned first embodiment, and detailed description thereof will be omitted.

In step S302, when the slip parameter is equal to or less than the first threshold, the process proceeds to step S305. In step S305, whether the slip parameter is less than a second threshold is determined. The second threshold is a value less than the first threshold. The second threshold may be a constant value preset in consideration of work efficiency. The second threshold may be set by the operator using the input device 25. When the slip parameter is less than the second threshold, the process proceeds to step S306.

Figure 12:
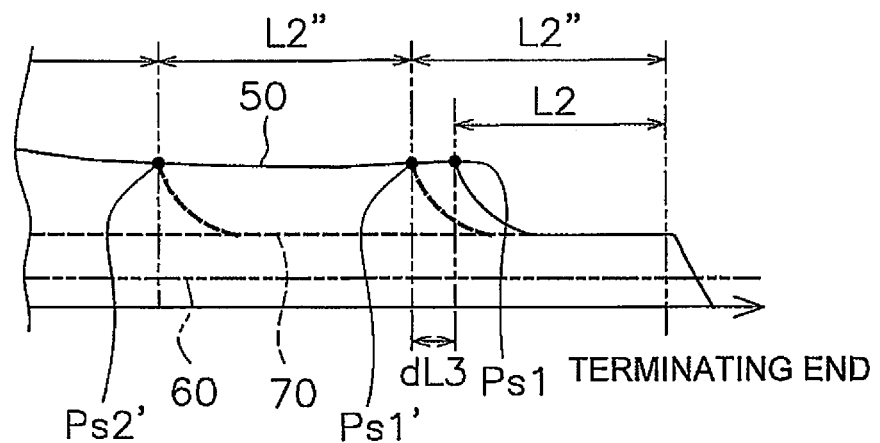
FIG. 12 is a diagram illustrating a method for modifying a start position.

In step S306, the controller 26 modifies the target distance L2 so as to increase the target distance L2. As illustrated in FIG. 12, the controller 26 modifies the target distance from the initial value L2 to L2". An increase dL3 of the target distance increased from L2 to L2" may be a constant value. Alternatively, the increase dL3 of the target distance may be determined by the controller 26 according to the slip parameter. That is, the controller 26 may modify the target distance L2 so as to increase the target distance L2 as the slip parameter decreases.

Then, the controller 26 modifies the start position in step S304. As illustrated in FIG. 12, the controller 26 determines, as the modified first start position Ps1', a position that is away from the terminating end toward the starting end by the modified target distance L1'. When the slip parameter is less than the second threshold, the controller 26 determines, as the modified first start position Ps1', a position that is far from the terminating end than the initial first start position is. The modification of another start position and the control of the work implement 13 based on the modified start position are the same as the aforementioned first embodiment, and detailed description thereof will be omitted.

When the slip parameter is equal to or greater than the second threshold in step S305, the modification of the start position in step S304 is not performed. In this case, the controller 26 digs each cut according to the work sequence initially determined.

In the second embodiment described above, the target distance L2 is modified according to the slip parameter. Specifically, when the slip parameter is greater than the first threshold, the target distance L2 is modified so as to decrease the target distance L2. This enables to prevent the travel device 12 from slipping excessively. Accordingly, a reduction in work efficiency can be prevented. When the slip parameter is less than the second threshold, the target distance L2 is modified so as to increase the target distance L2. A state where the travel device 12 slips slightly by a certain load applied to the work vehicle 1 is the state where work efficiency is the most optimal. Therefore, when the slip parameter is less than the second threshold, the target distance L2 is increased, and this enables to prevent the load applied to the work vehicle 1 from becoming excessively small and prevent from generating unnecessary margin of the vehicle capability. As a result, a reduction in work efficiency can be prevented.

Although embodiments of the present invention has been described so far, the present invention is not limited to the above embodiments and various modifications may be made within the scope of the invention.

The work vehicle 1 is not limited to a bulldozer, and may be another vehicle such as a wheel loader, a motor grader, a hydraulic excavator, or the like.

The work vehicle 1 may be remotely operable. In this case, a portion of the control system 3 may be disposed outside of the work vehicle 1. For example, the controller 26 may be disposed outside of the work vehicle 1. The controller 26 may be positioned in a control center that is away from the work site. In this case, the work vehicle 1 may be a vehicle that does not include the operating cabin 14.

The work vehicle 1 may be a vehicle driven by an electric motor. In this case, a power supply may be positioned outside the work vehicle 1. The work vehicle 1 to which the power is supplied from the outside may be a vehicle without an internal combustion engine and an engine compartment.

Figure 13:
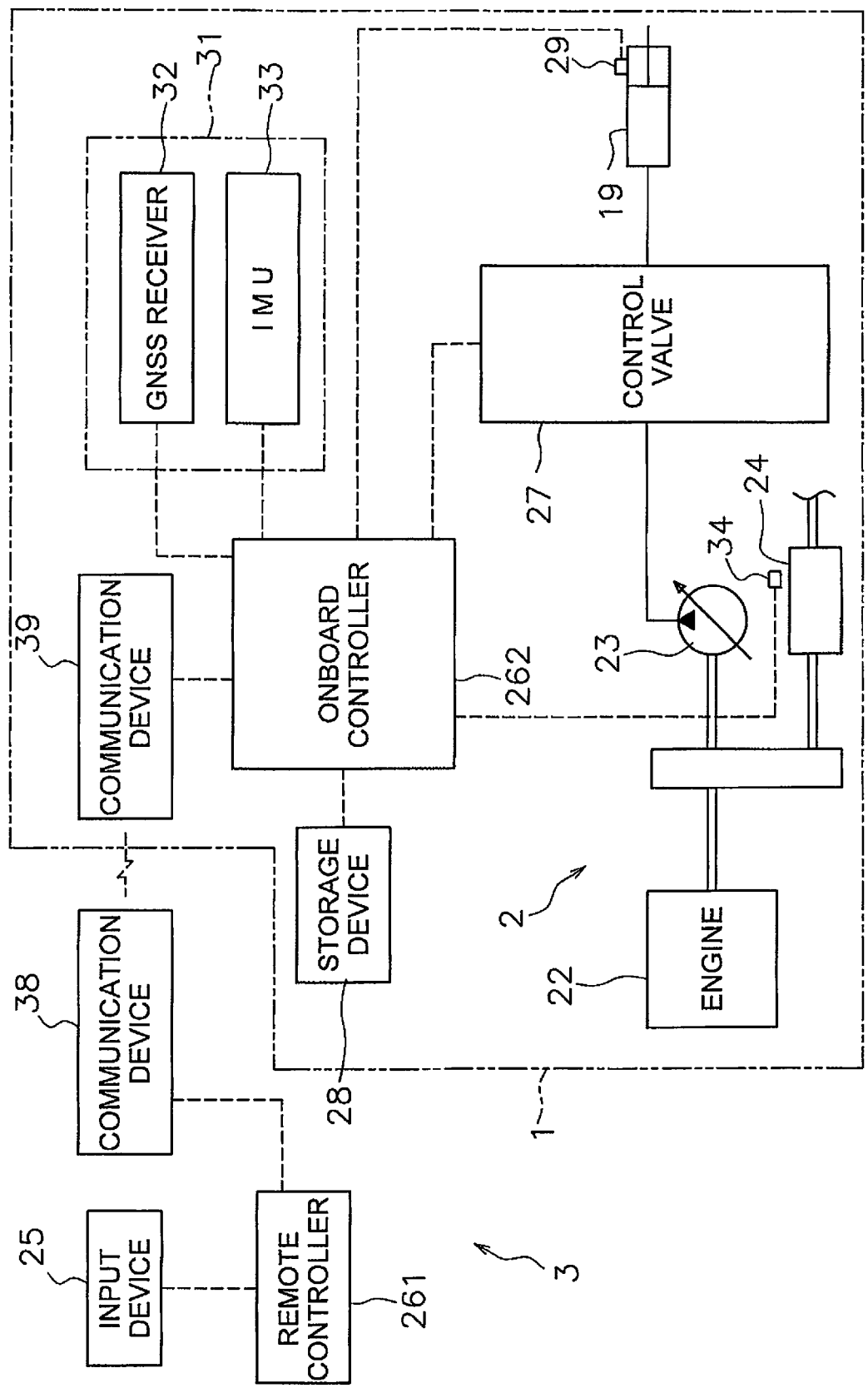
FIG. 13 is a block diagram of a configuration according to a first modified example of a control system.

The controller 26 may have a plurality of controllers 26 separated from one another. For example, as illustrated in FIG. 13, the controller 26 may include a remote controller 261 disposed outside of the work vehicle 1 and an onboard controller 262 mounted on the work vehicle 1. The remote controller 261 and the onboard controller 262 may be able to communicate wirelessly via communication devices 38 and 39. Some of the aforementioned functions of the controller 26 may be executed by the remote controller 261, and the remaining functions may be executed by the onboard controller 262. For example, the processing for determining the target design topography 70 and the work sequence may be executed by the remote controller 261, and the processing for outputting a command signal to the work implement 13 may be executed by the onboard controller 262.

The input device 25 may be positioned outside the work vehicle 1. In this case, the operating cabin may be omitted from the work vehicle 1. Alternatively, the input device 25 may be omitted from the work vehicle 1. The input device 25 may include an operating member such as an operating lever, a pedal, a switch for operating the travel device 12 and/or the work implement 13. The traveling back and forth of the work vehicle 1 may be controlled according to the operation of the input device 25. The movement such as raising and lowering of the work implement 13 may be controlled according to the operation of the input device 25.

Figure 14:
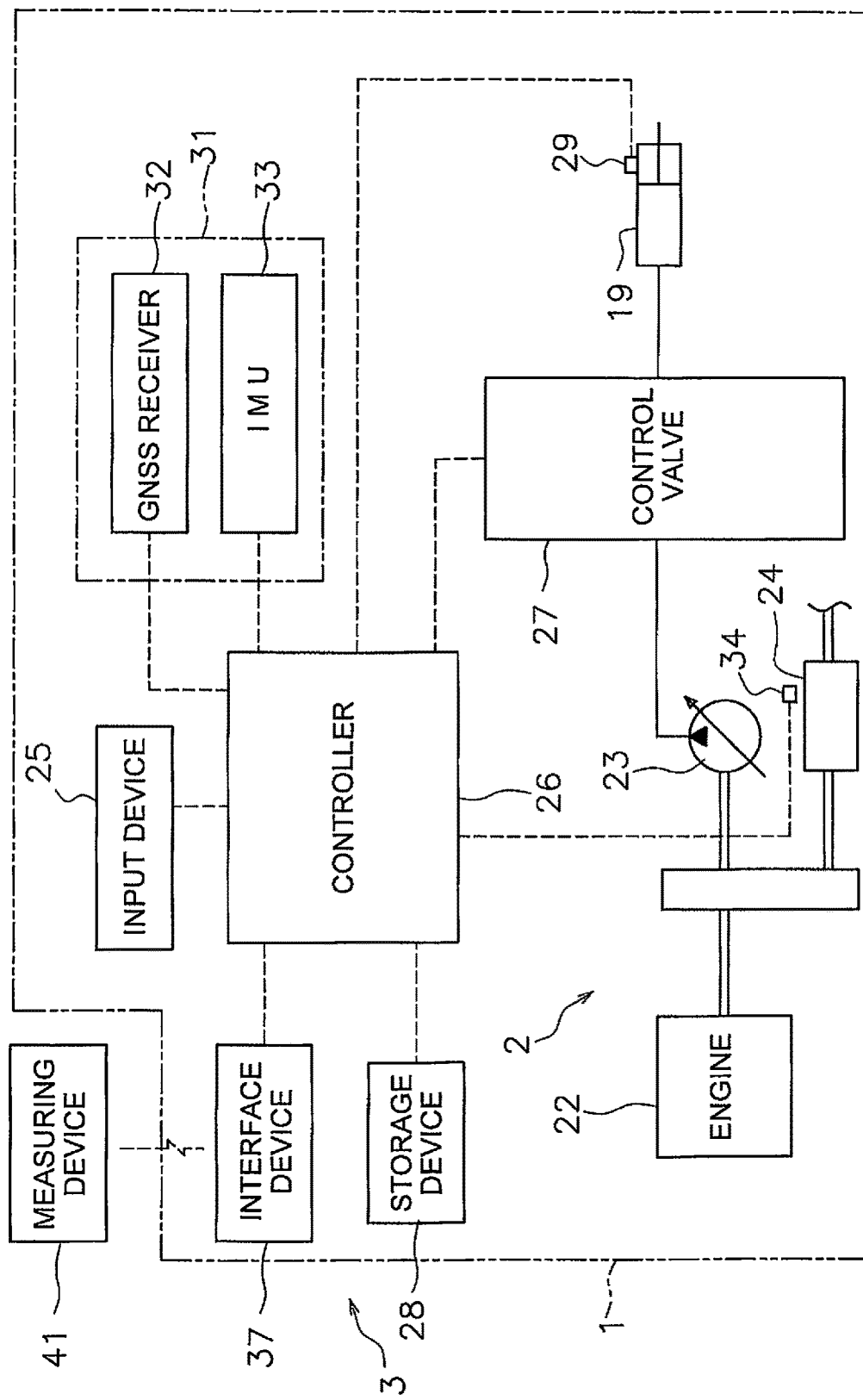
FIG. 14 is a block diagram of a configuration according to a second modified example of a control system.
Figure 15:
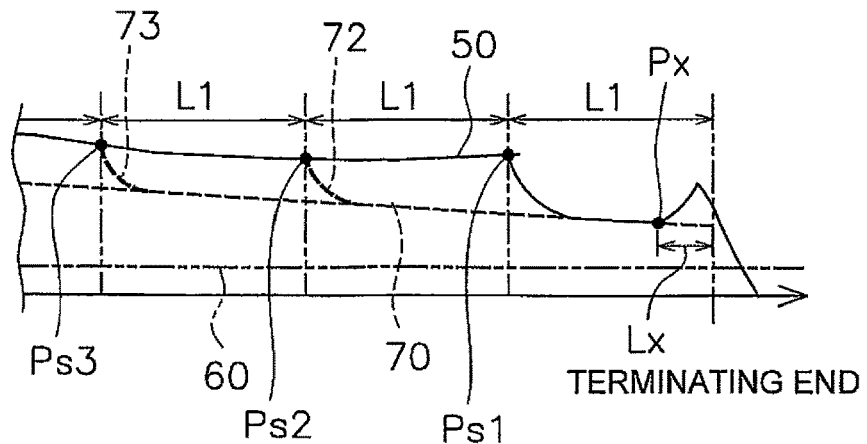
FIG. 15 is a diagram illustrating a modified example of a target design topography.

The actual topography 50 may be acquired by another device, instead of the aforementioned position sensor 31. For example, as illustrated in FIG. 14, the actual topography 50 may be acquired by an interface device 37 that receives data from an external device. The interface device 37 may wirelessly receive the actual topography data measured by an external measuring device 41. Alternatively, the interface device 37 may be a recording medium reading device and may receive the actual topography data measured by the external measuring device 41 via the recording medium.

The method for determining the target design topography 70 is not limited to that of the above embodiment, and may be changed. For example, the target design topography 70 may be a topography acquired by vertically displacing the actual topography 50 by a predetermined distance. Alternatively, the target design topography 70 may be a topography inclined at a predetermined angle with respect to the horizontal direction. The predetermined angle may be set by the operator. Alternatively, the controller 26 may automatically determine the predetermined angle.

The method for modifying the start position is not limited to that of the above embodiments, and may be changed. For example, the process of step S202 may be omitted in the first embodiment. The process of step S302 may be omitted in the second embodiment.

In the first embodiment, the target distance L1 is modified so as to decrease the target distance L1 based on the remaining distance Lx. The controller 26 may modify the target distance L1 so as to increase the target distance L1 based on the remaining distance Lx. For example, the controller 26 may modify the target distance L1 so as to increase the target distance L1 when the remaining distance Lx is zero.

In the first embodiment, the target distance L1 is modified based on the remaining distance Lx. The remaining distance Lx is the distance from the point Px at which the tip of the blade 18 moves away from the target design topography 70 to the end position. The controller 26 may modify the target distance L1 based on a remaining soil distance indicating a degree of the remaining soil that is present to the end position. The remaining soil distance is not limited to the remaining distance Lx. For example, the remaining soil distance may be a distance from a position where the tip of the blade 18 emerges on the actual topography 50 to the end position. Alternatively, the controller 26 may modify the target distance L1 based on a remaining soil amount indicating a degree of the remaining soil that is present to the end position.

When determining the modified target distance LP, the controller 26 may determine a plurality of start positions at or after a next start position based on the target distance L1'. Alternatively, when determining the modified target distance L1', the controller 26 may determine only the next start position based on the target distance L1'. In other words, only the next target distance L1' may be determined each time when digging is performed from each start position. In this case, the next target distance L1' may vary each time the digging is performed from each start position.

Figure 16:
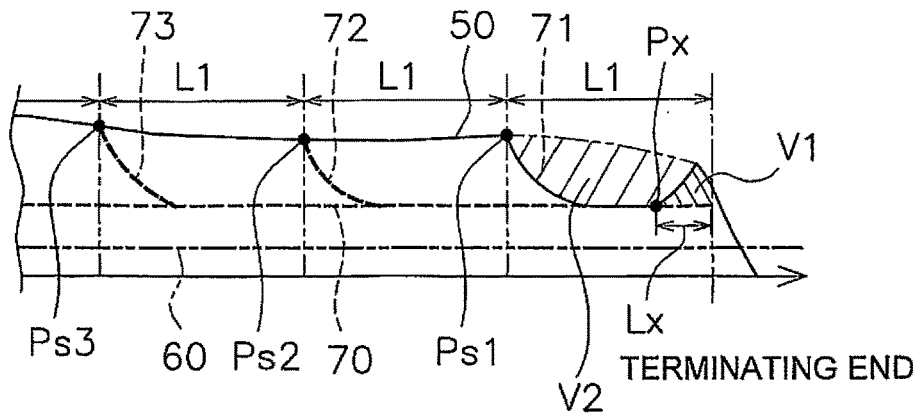
FIG. 16 is a diagram illustrating a modified example of a method for modifying a start position according to a first embodiment.

As illustrated in FIG. 16, the controller 26 may calculate a remaining soil amount V1 to modify a next start position in consideration of the remaining soil amount V1. For example, the controller 26 may modify the next start position so that the remaining soil amount is less than V1 in a next work. Alternatively, in the case where the controller 26 determines the next start position based on the target soil amount, the controller may modify the next start position based on the soil amount acquired by subtracting the remaining soil amount V1 from the target soil amount. The controller 26 may modify the target soil amount based on the remaining soil distance indicating the degree of the remaining soil that is present to the end position.

As illustrated in FIG. 16, the controller 26 may calculate a dug soil amount V2 to modify the next start position so that next digging can be performed with a soil amount equivalent to the dug soil amount V2. The dug soil amount V2 when a soil remains can be regarded as the maximum dug soil amount of the work vehicle 1 in the work condition. Therefore, the work efficiency can be improved by modifying the next start position according to the dug soil amount V2 as described above.

For example, the controller 26 may set the dug soil amount V2 when the remaining soil generates to the target soil amount after the next time, and modify the next start position based on the modified target soil amount. Alternatively, the controller 26 may use the remaining soil amount V1 and the dug soil amount V2 to modify the next start position so that digging can be performed with no generation of remaining soil at the maximum dug soil amount of the work vehicle 1.

Figure 17:
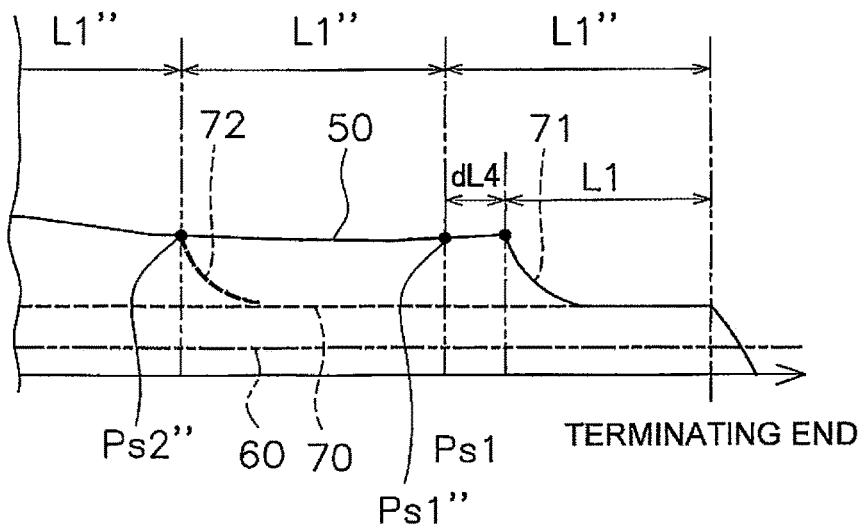
FIG. 17 is a diagram illustrating a modified example of a method for modifying a start position according to a first embodiment.

As illustrated in FIG. 17, the controller 26 may modify the target distance L1 so as to increase the target distance L1 when the work implement 13 reaches the end position without moving away from the target design topography 70. For example, as illustrated in FIG. 17, the controller 26 may modify the target distance from L1 to L1" which is larger than L1 when the work implement 13 reaches the end position without moving away from the target design topography 70.

The controller 26 may determine, as a modified first start position Ps1", a position that is away from the terminating end toward the starting end by the modified target distance L1". The controller 26 may determine, as the modified first start position Ps1", a position that is further away from the terminating end than the initial first start position Ps1 is. The controller may determine the modified first start position Ps" as a second end position and determines, as a modified second start position Ps2", a position that is away from the second end position toward the starting end by the modified target distance L1".

Hereinafter, the controller 26 may similarly modify a plurality of start positions in the work area. When the work implement 13 reaches the end position without moving away from the target design topography 70, the controller 26 may increase the target soil amount by a predetermined soil amount to modify the next start position based on the modified target soil amount.

In the second embodiment, the target distance is modified according to the slip parameter. The controller 26 may modify the target distance based on the load parameter indicating the magnitude of the load on the travel device 12. The load parameter is not limited to the slip parameter. For example, the load parameter may be traction force of the work vehicle 1. The range of the optimal traction force may be determined by a model of the work vehicle 1, for example.

The modifying the target distance based on a result whether the load control has occurred is an example of modifying the target distance according to the load parameter. Also, the controller 26 may sense whether a shoe slip has occurred, and whether the shoe slip has occurred is an example of the load parameter or the slip parameter. In this case, sensing that a shoe slip has occurred applies when the slip parameter is equal to or less than the first threshold in step S302 in the second embodiment.

Figure 18:
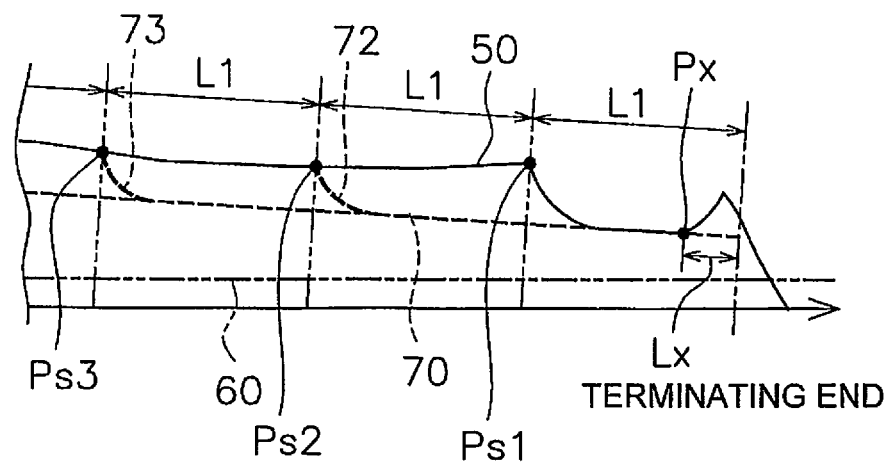
FIG. 18 is a diagram illustrating a modified example of a start position and a remaining distance.

When the target design topography 70 is inclined as above, as illustrated in FIG. 18, the remaining distance Lx may be a distance in a direction parallel to the target design topography 70 from the point Px at which the tip of the blade 18 moves away from the target design topography 70 to the terminating end. When the target design topography 70 is inclined, the controller 26 may determine, as the start position, a position that is away from the end position by the target distance L1 in the direction parallel to the target design topography 70.

Figure 19:
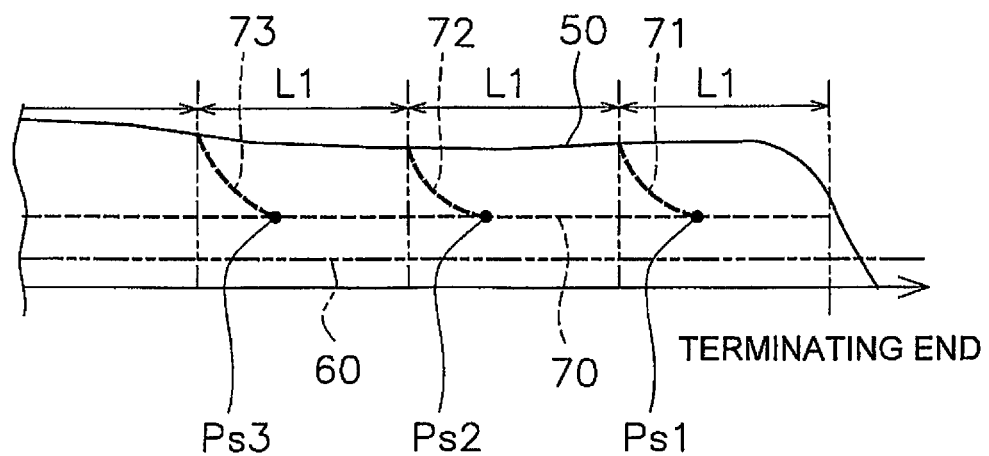
FIG. 19 is a diagram illustrating a modified example of a start position and an end position.

The end position and the start position are not limited to a point on the actual topography 50 in the above embodiments, and may be another point. For example, as illustrated in FIG. 19, the controller 26 may determine, as the end position and the start position, an intersection of the target design topography 70 and the cut at the previous work.

The controller 26 may execute the load control in parallel with the control of the work implement 13 according to the target design topography 70 as described above. Under the load control, the controller 26 determines whether the load on the work implement 13 is equal to or greater than a predetermined load threshold. When the load on the work implement 13 is equal to or greater than the predetermined load threshold, the controller 26 raises the work implement 13. Specifically, the controller 26 acquires traction force of the work vehicle 1 and regards the traction force as the load on the work implement 13 to make a determination. The controller 26 may execute the aforementioned processing for modifying the start position when raising the work implement 13 by executing the load control.

The controller 26 calculates the traction force from a sensed value of the output sensor 34. In the case where the power transmission device 24 of the work vehicle 1 is an HST, the controller 26 can calculate the traction force from the hydraulic pressure of the hydraulic motor and the rotation speed of the hydraulic motor.

In the case where the power transmission device 24 has a torque converter and a transmission, the controller 26 can calculate the traction force from the output rotation speed of the torque converter. Specifically, the controller 26 calculates the traction force from the following formula (2).

$$F = k \times T \times R / (L \times Z) \tag{2}$$

At this time, F is a traction force, k is a constant, T is a transmission input torque, R is a reduction ratio, L is a crawler belt link pitch, and Z is the number of sprocket teeth. The input torque T is calculated based on the output rotation speed of the torque converter. The method for sensing the traction force is not limited to the aforementioned method, and may be another method.

According to the present invention, a reduction in work efficiency can be prevented under automatic control of the work vehicle.

The invention claimed is:

1. A control system for a work vehicle including a work implement, the control system comprising:
   a controller configured to
      determine a target design topography at least partially positioned below an actual topography, the target design topography being indicative of a target trajectory of the work implement,
      determine a work area having a terminating end, and
      generate command signals to cause the work vehicle to perform digging work in accordance with the target design topography by making a plurality of cuts in the work area, the plurality of cuts including at least a first cut and a second cut, the first cut being closer to the terminating end than the second cut,
   the controller being configured to execute the first cut and the second cut by
      determining a first end position and a first start position of the first cut, the first start position being farther from the terminating end than the first end position and the first start position being spaced from the first end position by a first target distance along a direction opposite a traveling direction of the work vehicle,
      causing the work vehicle to dig the first cut from the first start position toward the first end position in the traveling direction,
      assessing a result of the first cut,
      modifying the first target distance based on the result of the first cut to obtain a second target distance,
      determining a second end position and a second start position of the second cut, the second start position being farther from the terminating end than the second end position and the second start position being spaced from the second end position by the second target distance along the direction opposite the traveling direction, and
      causing the work vehicle to dig the second cut from the second start position to the second end position in the traveling direction.

2. The control system for a work vehicle according to claim 1, wherein
   the controller is further configured to modify the first target distance by decreasing the first target distance according to a length of a remaining soil distance indicating a degree of a remaining soil that is present up to the first end position, when the work implement moves away from the target design topography before reaching the first end position.

3. The control system for a work vehicle according to claim 1, wherein
   the controller is further configured to modify the first target distance by increasing the first target distance, when the work implement reaches the first end position without moving away from the target design topography.

4. The control system for a work vehicle according to claim 1, wherein
   the controller is further configured to modify the first target distance by decreasing the first target distance according to a remaining soil amount indicating a degree of a remaining soil that is present up to the first end position, when the work implement moves away from the target design topography before reaching the first end position.

5. The control system for a work vehicle according to claim 1, wherein
the controller is further configured to modify the first target distance by decreasing the first the target distance according to a length of a remaining soil distance indicating a degree of a remaining soil that is present up to the first end position, when load control that raises the work implement in order to release a load on the work implement is executed.

6. A control system for a work vehicle including a travel device and a work implement, the control system comprising:
a controller configured to
determine a target design topography at least partially positioned below an actual topography, the target design topography being indicative of a target trajectory of the work implement,
determine a work area having a terminating end, and
generate command signals to cause the work vehicle to perform digging work in accordance with the target design topography by making a plurality of cuts in the work area, the plurality of cuts including at least a first cut and a second cut, the first cut being closer to the terminating end than the second cut,
the controller being configured to execute the first cut and the second cut by
determining a first end position and a first start position of the first cut, the first start position being farther from the terminating end than the first end position and the first start position being spaced from the first end position by a first target distance along a direction opposite a traveling direction of the work vehicle,
causing the work vehicle to dig the first cut from the first start position toward the first end position in the traveling direction,
acquiring a load parameter indicating a magnitude of a load on the travel device during the first cut,
modifying the first target distance according to the load parameter to obtain a second target distance,
determining a second end position and a second start position of the second cut, the second start position being farther from the terminating end than the second end position and the second start position being spaced from the second end position by the second target distance along the direction opposite the traveling direction, and
causing the work vehicle to dig the second cut from the second start position to the second end position in the traveling direction.

7. The control system for a work vehicle according to claim 6, wherein
the controller is further configured to
determine whether the load parameter is greater than a predetermined first threshold, and
decrease modify the first target distance by decreasing the first target distance when the load parameter is greater than the first threshold.

8. The control system for a work vehicle according to claim 6, wherein
the controller is further configured to
determine whether the load parameter is less than a predetermined second threshold, and
modify the first target distance by increasing the first target distance when the load parameter is less than the second threshold.

* * * * *